United States Patent [19]

Owens

[11] Patent Number: 4,838,730
[45] Date of Patent: Jun. 13, 1989

[54] PORTABLE SCREED WITH FLOATING SCREED PLATE

[76] Inventor: Joseph M. Owens, 842 Lake Holiday Dr., Sandwich, Ill. 60548

[21] Appl. No.: 188,041

[22] Filed: Apr. 29, 1988

[51] Int. Cl.⁴ .............................................. E01C 19/35
[52] U.S. Cl. ..................................... 404/114; 404/97; 404/120
[58] Field of Search ................. 404/114, 118, 120, 97, 404/133, 102; 425/456, 458

[56] References Cited

U.S. PATENT DOCUMENTS

| | | | |
|---|---|---|---|
| 2,599,330 | 6/1952 | Jackson | 404/114 |
| 4,340,351 | 7/1982 | Owens | 425/456 |
| 4,386,901 | 6/1983 | Morrison | 425/456 |
| 4,650,366 | 3/1987 | Morrison | 404/114 |
| 4,752,156 | 6/1988 | Owens | 404/118 |
| 4,798,494 | 1/1989 | Allen | 404/114 |

Primary Examiner—Jerome W. Massie, IV
Assistant Examiner—Matthew Smith
Attorney, Agent, or Firm—Lee & Smith

[57] ABSTRACT

A portable screed for working concrete and having an elongated screed plate which has a flat bottom bearing surface and a width sufficient to permit the screed to float on the concrete while the screed is being guided by an operator. For imparting uniform vibrations to the screed plate for tamping the concrete, the screed includes a stiffening brace extending substantially the length of the screed, a series of rigid, spaced cross supports secured to the brace, and a vibratory mechanism connected to vibrate the screed plate through the cross supports. A motor is mounted on the screed plate for operating the vibratory mechanism.

21 Claims, 3 Drawing Sheets

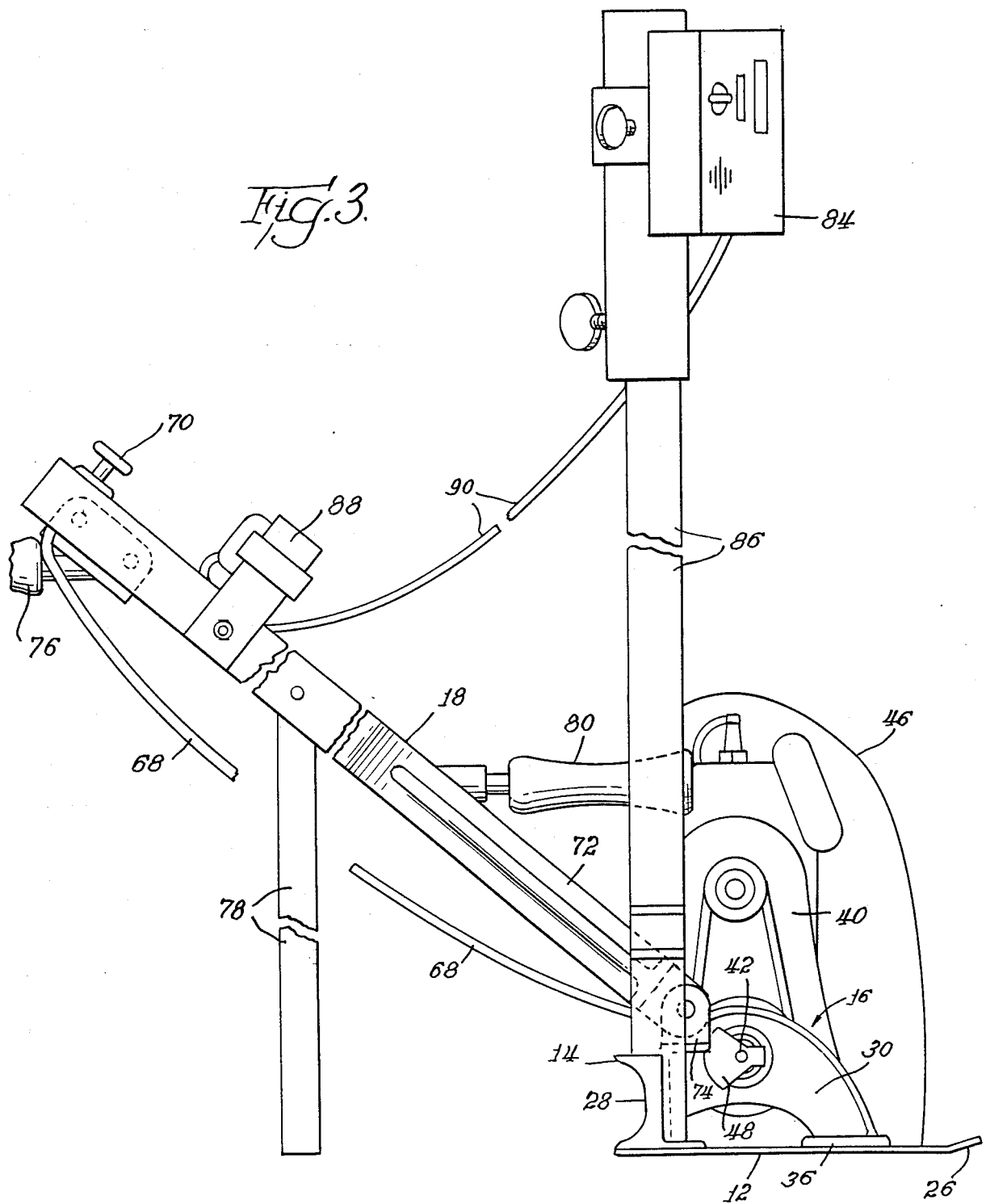

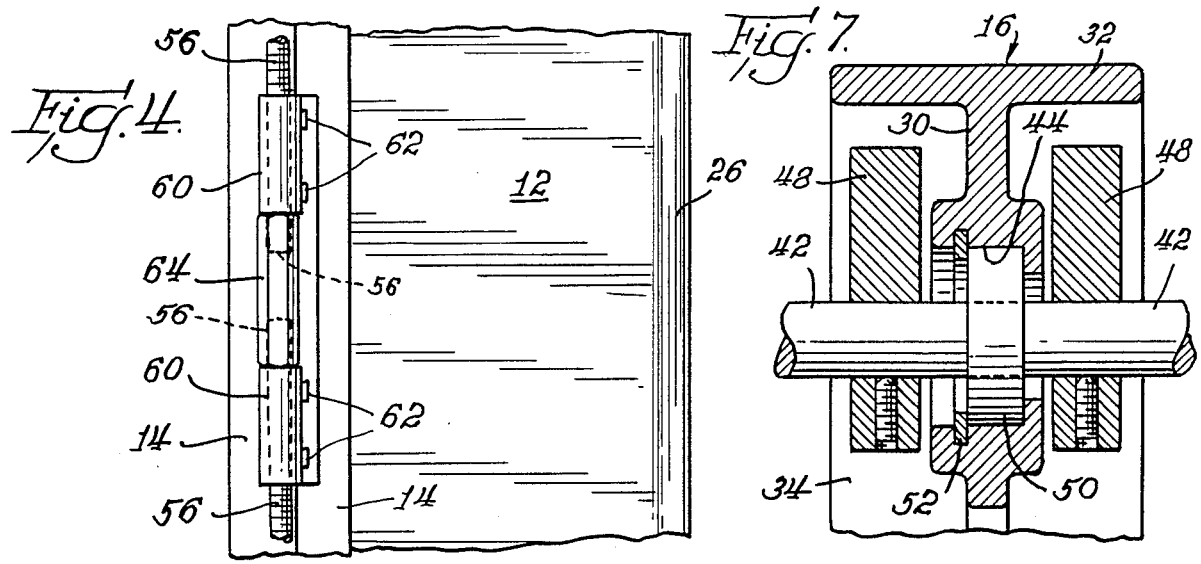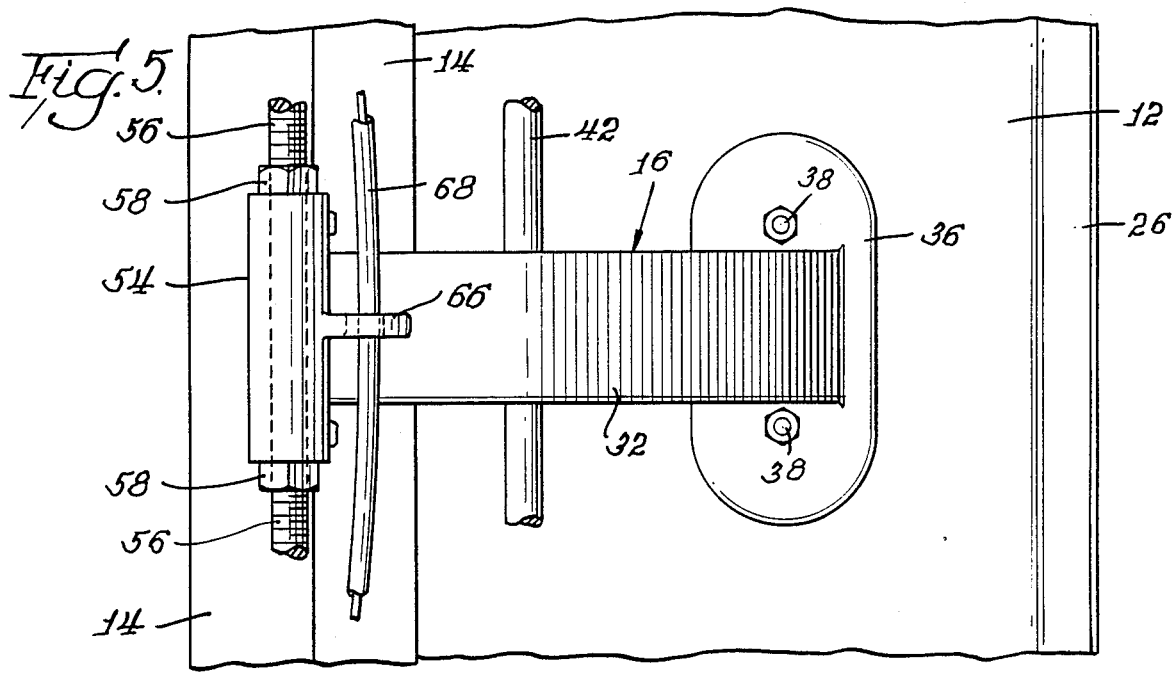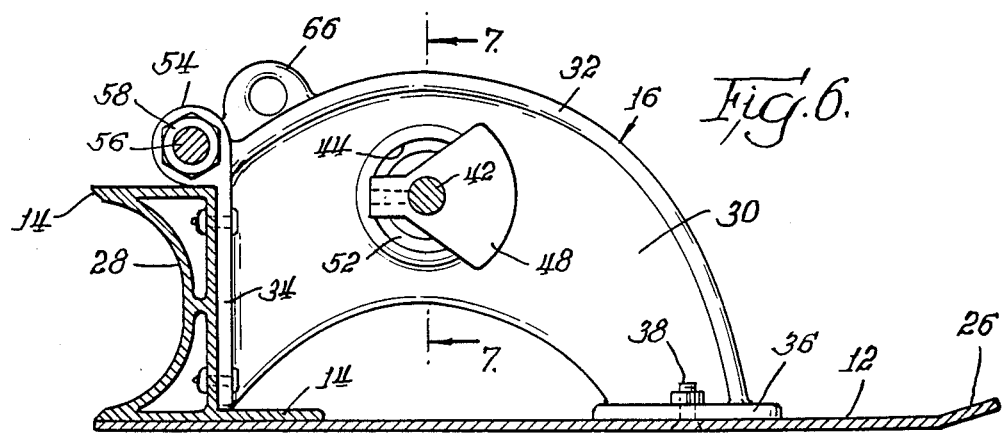

PORTABLE SCREED WITH FLOATING SCREED PLATE

BACKGROUND OF THE INVENTION

This invention relates to concrete screeds and in particular to a portable screed which is guided by one or more operators to smooth freshly-poured concrete prior to finishing and curing. More particularly, the invention is directed to a screed which essentially floats on the surface of the plastic concrete as it is being tamped and leveled.

As explained in my co-pending U.S. patent application Ser. No. 006,895, filed Jan. 27, 1987, allowed tolerances for concrete surfaces have decreased, demanding greater precision in the smoothing and leveling of the concrete before it is cured. My co-pending application describes a laser-guided screed which can be operated to such close tolerances.

The screed of my co-pending application utilizes a screed plate similar to that commonly in use, having a width on the order of three inches. One problem encountered with the screed plate is the tendency of the screed to sink within the plastic concrete unless the operator carefully supports the screed during the screeding operation. For quite light screeds, constant supporting of the screed by the operator may not be a problem. However, for self-contained screeds, where the vibratory means is mounted on the screed, although the screed remains quite portable, the necessity for the operator to constantly lift the screed to retain its proper orientation can be quite tiring.

SUMMARY OF THE INVENTION

The invention provides a portable screed for working concrete, the screed being manually operated by an operator who physically guides the screed over an area of freshly poured concrete and who manually levels the screed and the concrete by raising or lowering the screed while the screed is in motion. The screed includes an elongated screed plate, the screed plate having a flat bottom bearing surface and having a width sufficient to permit the screed to float on the concrete while the screed is being guided. To impart uniform rigidity to the screed plate, the invention includes a brace extending substantially the length of the screed plate which is rigidly secured to the screed plate. A series of rigid, spaced cross supports are secured to the brace, and a vibratory mechanism is carried by the screed and is connected to vibrate the screed plate.

In accordance with the preferred embodiment of the invention, the vibratory mechanism comprises a driven, elongated eccentric shaft. The shaft comprises a substantially uniform shaft which has a series of eccentric weights attached thereto. For rotating of the shaft, a motor is mounted on the screed plate and is carried with the screed through the screeding operation. The screed is therefore self-contained.

Each of the cross supports includes a central aperture, with the apertures being aligned and with the eccentric shaft passing through the apertures. At least two of the cross supports include bearings in the apertures with the shaft being journaled for rotation within the bearings. In accordance with the preferred embodiment of the invention, the shaft is located closer to one side of the screed plate than to the other so that the screed plate can be essentially self-propelled.

Each cross support includes a web extending perpendicular to the brace and to the screed plate. In addition to being attached to the brace, the web is also secured to the screed plate at a location spaced from the brace. Each cross support includes a flange extending perpendicular to the web, and the eccentric weights are located closely adjacent to the webs of the cross supports, with the weights being oriented directly beneath the extending flanges.

Each of the cross supports includes a hollow guide with a screed surface adjustment rod passing through the guides. The rod is adjustable relative to each cross support in order to shape the bottom bearing surface of the screed plate from flat to either concave or convex along the length of the screed, depending on the nature of the finished concrete surface desired.

BRIEF DESCRIPTION OF THE DRAWINGS

The invention is described in greater detail in the following description of an example embodying the best mode of the invention, taken in conjunction with the drawing figures, in which:

FIG. 3 is a side elevational view of the screed according to the invention with portions foreshortened to permit a larger scale drawing, FIG. 4 is an enlarged top plan view of the center portion of the screed, with the motor removed, showing interconnection of the two screed surface adjustment rods, FIG. 5 is a further enlarged fragmentary top plan view of the screed showing one of the cross supports for the screed, FIG. 6 is a cross sectional, side elevational view of the portion of the screed shown in FIG. 4, and FIG. 7 is a further enlarged cross sectional view taken along lines 7—7 of FIG. 6.

DESCRIPTION OF AN EXAMPLE EMBODYING THE BEST MODE OF THE INVENTION

Figure 1:
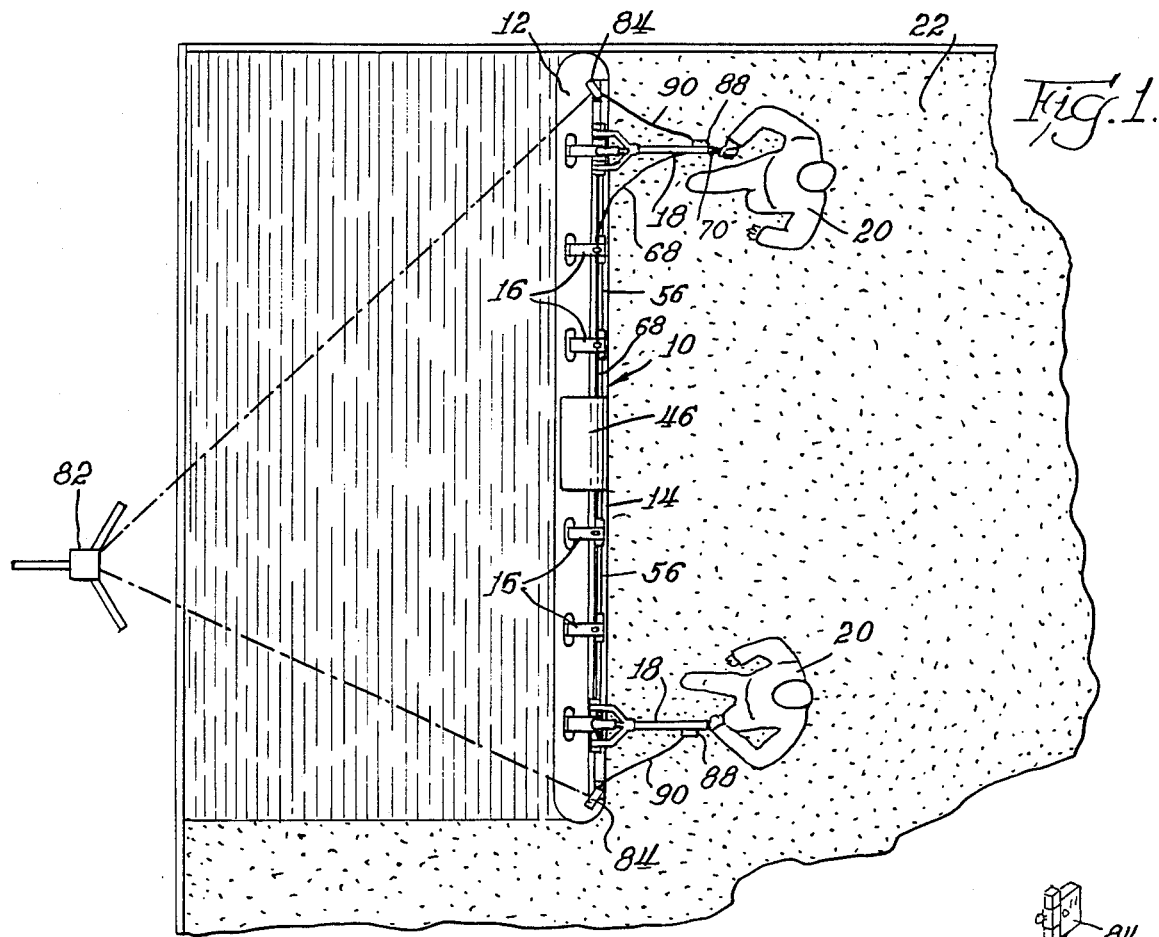
FIG. 1 is a top plan view of the invention when employed in the process of smoothing freshly-poured concrete.
Figure 2:
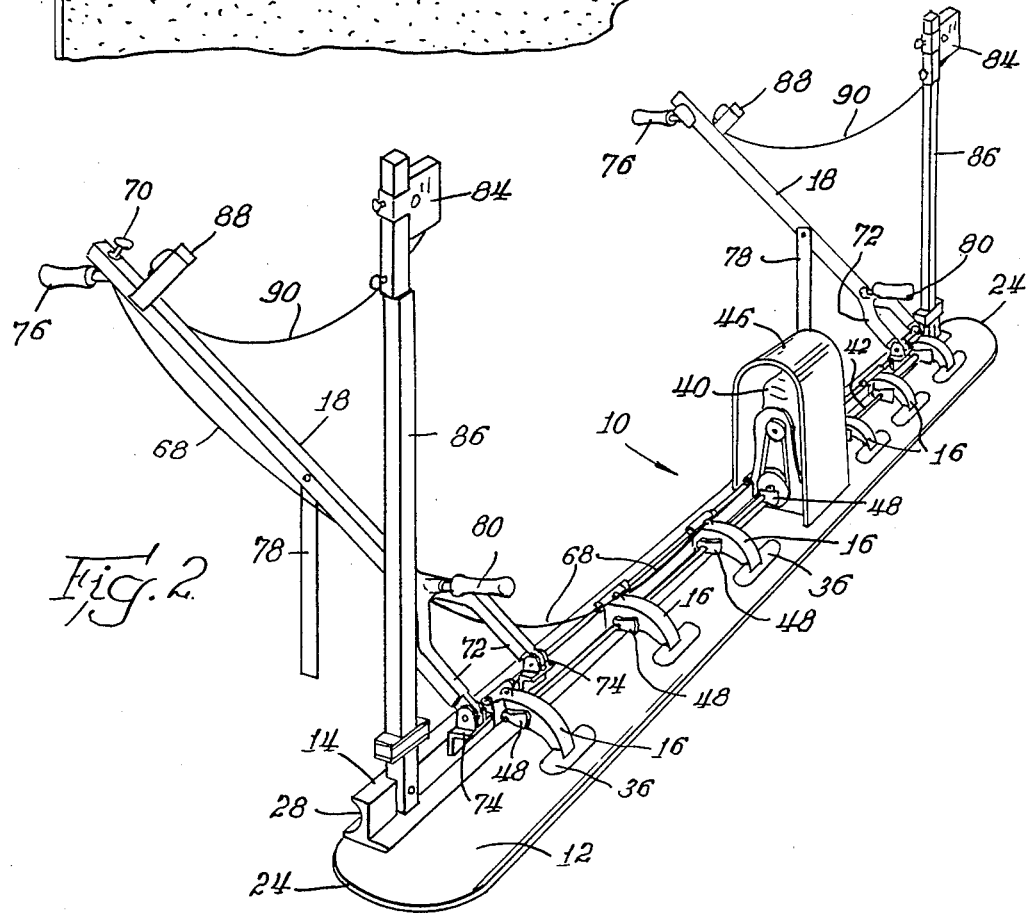
FIG. 2 is a perspective view of a portable screed according to the invention.

A screed according to the invention is shown generally at 10 in FIGS. 1 and 2. The screed 10 includes an elongated screed plate 12, a stiffening brace 14 extending substantially the length of the screed plate 12, a series of rigid, spaced cross supports 16 secured to both the brace 14 and the screed plate 12, and a pair of handles or control bars 18 mounted so that an operator 20 may guide the screed over a concrete surface, shown at 22 in FIG. 1. As is evident from the drawing figures, during operation of the screed 10, the operators 20 walked backwardly in the concrete 22, drawing the screed 10 toward them during the screeding operation.

As best shown in FIGS. 3 and 6, the screed plate 12 is generally flat, having rounded ends 24 and an upturned rear lip 26 extending the length thereof so that, if the screed plate 12 is repositioned by one or more of the operators pushing the screed rather than pulling it, the screed plate will not tend to dive within the plastic concrete 22.

The brace 14 extends substantially the length of the screed plate 12, and is intended to provide the necessary lateral rigidity to the screed 10. The brace 14 may be appropriately secured to the screed plate 12, such as by bolting, welding or otherwise. As illustrated in the drawing figures, the brace 14 includes a longitudinal concave scoop 28 extending the length of its facing side, the scoop serving the purpose of collecting excess concrete as the screed 10 is drawn across the plastic concrete surface 22.

The cross supports 16 are spaced at regular intervals along the length of the screed plate 12. The cross supports 16 provides additional support for the screed plate 12, carry the necessary vibratory mechanism, and include a sleeve or guide for fine adjustment of the bottom surface of the screed plate 12, all described in greater detail below.

Each of the cross supports 16 includes a web 30 which extends perpendicular to both the brace 14 and the screed plate 12. The web 30 is curved, as illustrated, and is topped by a flange 32 extending perpendicular to the web 30 outwardly equally on opposite sides of the web 30. Attachment brackets 34 and 36, oriented at right angels to one another, are located at opposite ends of the cross support 16, with the bracket 34 being affixed to the brace 14 and the bracket 36 being affixed to the screed plate 12, both by means of welding, bolts, or otherwise. As illustrated in the drawing figures, bolts 38 which are used to attach the brackets 36 to the screed plate 12 are countersunk into the bottom of the screed plate 12 so that the bottom surface of the screed plate 12 remains essentially smooth.

For imparting vibrations to the screed plate 12, the screed 10 includes a motor 40 which drives a rotatable shaft 42 which passes through a central aperture 44 in each of the webs 30. The motor 40 is appropriately attached to the screed plate 12 and/or the brace 14 (means not illustrated), and for its protection, may include a surrounding cowl 46.

To give the shaft 42 vibrational capabilities while it rotates, a series of eccentric weights 48 are securely attached to the shaft 42 periodically along its length. As illustrated in the drawings, one of the weights 48 is secured to the shaft on each side of the web 30 of each of the cross supports 16. As best shown in FIG. 7, the weights 48 are secured beneath the flange 32 to both protect the rapidly rotating weights from debris and also protect the operators 20 from inadvertent injury.

The shaft 42 is journalled in a bearing 50 situated within the aperture 44 of the web 30 of each of the cross supports 16, as best illustrated in FIG. 7. A snap ring 52 is used to hold the bearing 50 in place. As best illustrated in FIGS. 2, 5 and 6, the aperture 44 is located such that the shaft 42 is situated closer to the brace 14 than the trailing lip 26 of the screed plate 12. With the shaft 42 being offset toward the travel direction of the screed, rotation of the shaft 42 tends to self-propel the screed 10 in the travel direction of the screed.

A hollow guide 54 is secured to each bracket 34 above the flange 32. A threaded adjustment rod 56 passes through each of the guides 54, with the rod 56 bearing captured on opposite sides of each guide 54 by a pair of nuts 58. By judicious adjustment of the nuts 58 on the rod 56, the screed plate 12 can be maintained flat, raised slightly in a convex fashion, or lowered slightly at its ends 24 in a concave fashion.

The rod 56 may extend for substantially the length of the screed plate 12, between the outer most cross supports 16 or may be joined in sections, as desired. Illustrated in FIG. 4 is the central portion of the screed plate 12 (with the motor 40, cowl 46 and shaft 42 removed), illustrating one means of separating the rod 56 into two sections. As illustrated, separate rods 56 pass into a bracket assembly 60 which is secured to the brace 14 by a series of bolts 62. Each of the rod portions 56 extends within a turn buckle 64 which holds each of the rods 56 securely in place.

Each of the cross supports 16 includes an eye 66 through which a throttle cable 68 of the motor 40 may be passed. As shown in FIG. 2, the throttle cable 68 passes from the motor 40 through the eyes 66 of two of the cross supports 16 and up to a throttle control 70 located on one of the handles 18.

Each handle 18 includes a yoke 72 at one end which is hingedly secured to a pair of brackets 74 attached to the brace 14. At the opposite end, each of the handles 18 includes a grip 76 used by the operator 20 to guide the screed 10 during the concrete smoothing operation. Because the handles 18 are hinged to the brace 14, each of the handles 18 also includes a rest 78 so that, when the operator 20 is not holding the grip 76, the handle 18 does not fall into the plastic concrete 22. To aid in transporting the screed 10, each of the handles 18 also includes a grip 80 at the yoke 72.

To aid in the leveling process, the screed 10 may include a laser guiding system described in Applicant's co-pending U.S. patent application Ser. No. 006,895, filed Jan. 27, 1987, now U.S. Pat. No. 4,752,156. The reader is referred to this patent for further details on the laser leveling system not set forth in the discussion below.

The laser leveling system includes a signal transmitter 82 and one or more signal sensors 84 mounted on posts 86 secured to the brace 14 of the screed 10. The sensors 84 are adjustable in vertical elevation on the posts 86 for proper reception of the leveling laser signal from the transmitter 82. For use by each of the operators 20, also included is a remote display 88 for each of the sensors 84, which is electrically connected to the respective sensor 84 by an appropriate electrical lead 90. Each of the sensors 84 is battery operated so that the screed 10 is truly self-contained and not dependent upon any outside source of energy for its operation.

A typical signal transmitter 82 generates its laser signal throughout a 360° reference plane. Each of the sensors 84 detects the signal from the transmitter 82, and by means of the remote display 88, advises the operator 20 whether the screed 10 should be raised or lowered (or maintained at its current elevation) during the screeding operation.

The screed 10 is portable, in that it may easily be transported by one or two individuals by means of the grips 80, and may easily be raised or lowered during the screeding operation to maintain a proper level of the concrete surface 22. The screed plate 12 of the screed 10 is wide enough so that the screed 10 "floats" on the surface of the concrete 22. That is to say, when the screed 10 is stationary on the surface of the concrete 22, when in the plastic state, the screed 10 will not sink. A width of the screed plate of 12 inches has been found to be quite satisfactory for this purpose. By allowing the screed 10 to float, the operators 20 have far greater latitude in operation of the screed 10, need only raise and lower the screed 10 by brute force when the level of the screed must be changed, and therefore are fatigued far less quickly than were the operators 20 required to constantly hold the screed 10 at a particular elevation on the concrete 22, as would be the case were the screed plate 12 far more narrow, such as that illustrated in copending application Ser. No. 006,895 filed Jan. 27, 1987.

Each of the supports 16 is an integral casting, preferably from a magnesium aluminum alloy which is therefore relatively light weight. The casting for each of the cross supports 16 includes both the hollow guide 54 and the eye 66 contributing to a compact, functional structure. With the flange 32 extending over each of the rotating eccentric weights 48, the cross supports 16 provides both safety and strength to the screed 10.

Various changes can be made to the invention without departing from the spirit thereof or scope of the following claims:

What is claimed is:

1. A portable screed for working concrete, said screed being manually operated by an operator who physically guides the screed over an area of freshly poured concrete and manually levels the screed and the concrete by raising or lowering the screed while the screed is in motion, comprising
   a. an elongated, single screed plate having opposite sides and opposite ends, said screed plate having a flat bottom bearing surface and having a width sufficient to permit the screed to float on the concrete while the screed is being guided, and
   b. means for imparting uniform vibrations to the screed plate for tamping the concrete, comprising
      i. a brace extending substantially the length of said screed plate between the ends thereof and being rigidly secured thereto along one side of said screed plate,
      ii. a series of rigid, spaced cross supports secured to said brace, each said cross support extending transversely from said brace substantially to an opposite side of said screed plate and being rigidly secured thereto, and
      iii. a vibratory mechanism connected to vibrate said screed plate.

2. a portable screed according to claim 1 in which said vibratory mechanism comprises a driven, elongated eccentric shaft.

3. A portable screed according to claim 2 in which said eccentric shaft comprises a substantially uniform shaft having a series of eccentric weights attached thereto.

4. A portable screed according to claim 2 including drive means carried by said screed for rotating said eccentric shaft.

5. A portable screed according to claim 4 in which said drive means comprises a motor mounted on said screed plate.

6. A portable screed according to claim 1 in which each cross support includes an aperture, said apertures being aligned, and said vibratory mechanism comprises a driven, elongated eccentric shaft passing through said apertures, at least two of said cross supports including bearings and said shaft being journalled for rotation within said bearings.

7. A portable screed according to claim 6 in which said shaft is located closer to said one side of said screed plate than to said opposite side of said screed plate.

8. A portable screed according to claim 1 in which said brace includes a longitudinal concave scoop extending along said one side.

9. A portable screed according to claim 1 in which the width of said screed plate is approximately 12 inches.

10. A portable screed according to claim 1 in which each cross support includes a web extending perpendicular to said brace and said screed plate, said web being secured to said screed plate at a location spaced from said brace.

11. A portable screed according to claim 10 in which said vibratory mechanism comprises a driven shaft having a series of eccentric weights attached thereto.

12. A portable screed according to claim 11 in which each cross support includes an aperture and said shaft passes through said apertures.

13. A portable screed according to claim 12 in which each weight is located adjacent to a said web, and each cross support includes a flange extending perpendicular to said web, said weight being located beneath said flange.

14. A portable screed according to claim 10 in which said cross support includes a bracket at opposite ends of said cross support for attachment of said cross support to said brace and said screed plate.

15. A portable screed according to claim 14 in which said brackets are disposed at right angles to one another.

16. A portable screed according to claim 10 including a hollow guide secured to each cross support, and including a screed surface adjustment rod passing through said guides, said rod including means for adjusting said rod relative to each cross support.

17. A portable screed according to claim 1 in which further including handle means secured to said screed plate and enabling an operator to pull said screed plate across the concrete.

18. A cross support for a portable screed in which a plurality of the cross supports are mounted on a flat screed plate in a spaced relationship along the length of the screed plate, the cross support comprising
   a. a flat web extending perpendicular to said screed plate,
   b. a curved flange secured at the top of and extending perpendicular to said web,
   c. a central aperture in said web for attachment of a vibratory mechanism to impart uniform vibrations to the screed plate, and
   d. a bracket secured to each end of said web, said brackets comprising means for attachment of said cross support as an element of the portable screed.

19. A cross support according to claim 18 in which said brackets are spaced from one another and are disposed at right angles to one another.

20. A portable screed according to claim 18 including a hollow guide secured to said cross support and extending perpendicular to said web.

21. A portable screed according to claim 20 in which said guide is located adjacent one of said brackets.

* * * * *